United States Patent [19]

Werner et al.

[11] Patent Number: 4,584,169
[45] Date of Patent: Apr. 22, 1986

[54] PROCESS, APPARATUS AND INSTALLATION FOR THE CONTINUOUS PRODUCTION OF A FILLER WIRE

[75] Inventors: Alexander Werner, Glattbrugg; Heinz Pfenninger, Volketswil, both of Switzerland

[73] Assignee: Schweissindustrie Oerlikon Bührle AG, Zurich, Switzerland

[21] Appl. No.: 724,066

[22] Filed: Apr. 17, 1985

[30] Foreign Application Priority Data

Apr. 18, 1984 [EP] European Pat. Off. ........ 84104385.4

[51] Int. Cl.$^4$ .............................................. B22F 5/00
[52] U.S. Cl. ......................................... 419/3; 419/4;
419/8; 419/30; 419/31; 419/38; 419/43;
419/66; 419/69; 228/126; 228/131; 228/132;
29/33 D; 29/33 F; 29/DIG. 3; 72/369; 428/558
[58] Field of Search .................. 228/126, 131, 132;
419/3, 4, 8, 30, 31, 38, 43, 69, 66; 29/33 D, 33
F, DIG. 3; 428/558; 72/369

[56] References Cited

U.S. PATENT DOCUMENTS

| 3,226,814 | 1/1966 | Leib et al. | 419/8 |
| 3,452,419 | 7/1969 | Hillert | 419/8 |
| 4,203,188 | 5/1980 | Blanpain et al. | 419/61 |
| 4,224,085 | 9/1980 | Brendel et al. | 419/8 |
| 4,235,007 | 11/1980 | Yamaji et al. | 419/8 |
| 4,305,197 | 12/1981 | Puschner et al. | 419/8 |

Primary Examiner—Stephen J. Lechert, Jr.
Attorney, Agent, or Firm—Bachman & LaPointe

[57] ABSTRACT

In the installation, a strip is shaped from a split tube which is welded or seamed to give a closed tube in a welding or seaming station. Associated with the welding or seaming station is a suction mechanism used for the removal of on the one hand the cold air flow produced by the moving open tube and on the other the air flow heated during welding and flowing back from the closed tube, as a result of the reduction of the internal cross-section thereof. This obviates air turbulence in the welding or seaming station, which could whirl up the pulverulent material introduced into the open tube in a dosing station and could be deposited on the longitudinal edges of the split tube. This could unfavorably influence the seaming or welding process.

15 Claims, 6 Drawing Figures

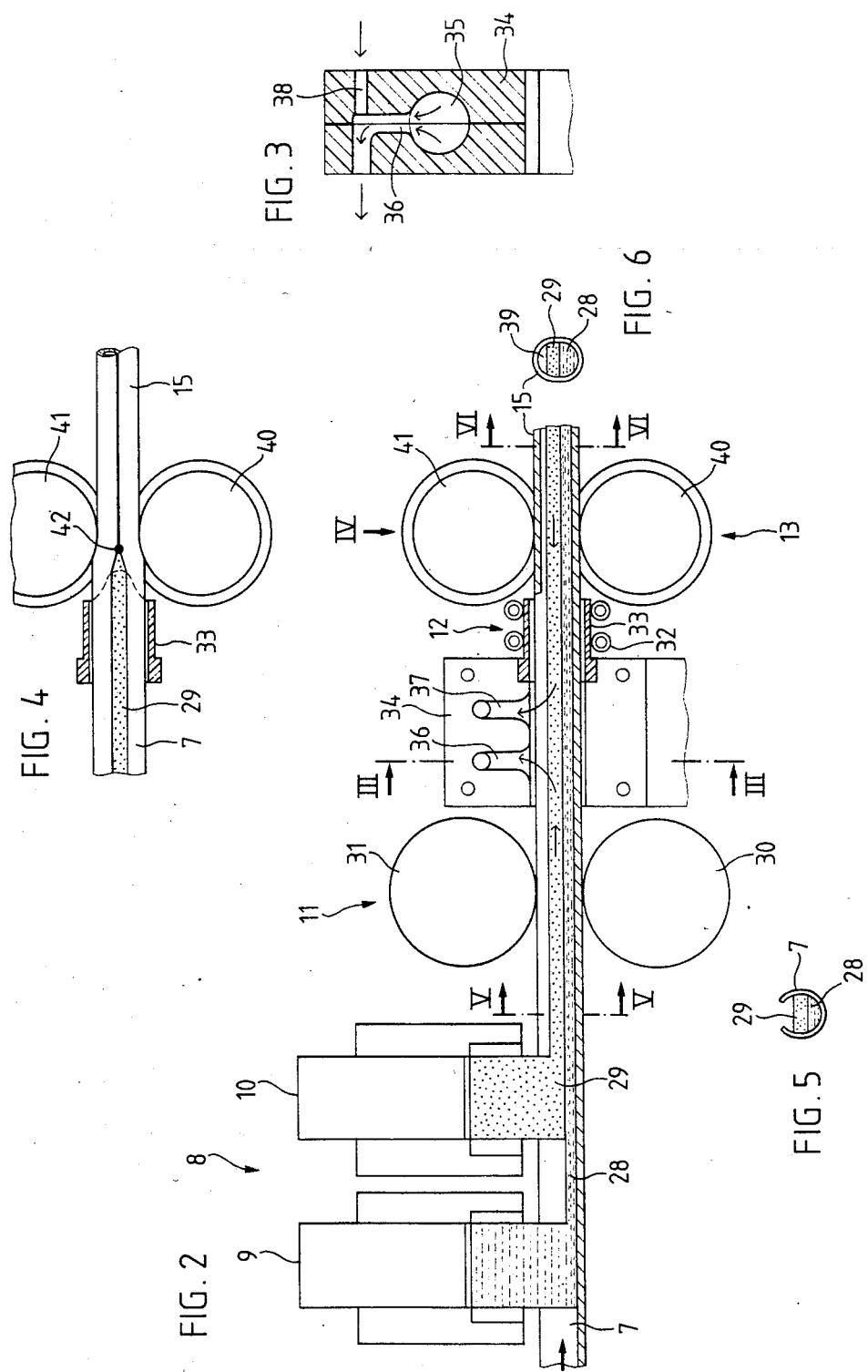

PROCESS, APPARATUS AND INSTALLATION FOR THE CONTINUOUS PRODUCTION OF A FILLER WIRE

BACKGROUND OF THE INVENTION

The present invention relates to a process and apparatus for the continuous production of a welded or seamed filler wire of random length formed from a metal tube and a pulverulent material filling and which is shaped from a metal strip in the form of a split or open joint tube which is open at the top, into which the pulverulent material is introduced during its continuous advance and which, by compression and welding or seaming its longitudinal edges, can be formed into a tube enclosing the material filling. The tube is then reduced to a smaller diameter forming the filler wire.

The production of a filler wire shaped in a continuous production process has long been known. With the installations used for this, it is possible to produce filler wires having a random length and differing construction, as well as for different fields of use. In a known process (EP-A-3,370) the filler wire is produced in the form of a powder-filled tube from a metal strip, the strip firstly being shaped into a channel, into which the powder is introduced and then the channel is shaped into a tube and welded. Contacts mounted on the tube are connected to a high frequency generator. The high frequency current introduced into the tube by the same is concentrated at the longitudinal edges of the channel compressed to form a tube and heats it to welding temperature. After welding, the weld bead formed by the welding process on the tube is levelled and the tube is calibrated or sized, before it is reduced to the final diameter by a drawing operation.

This process and the corresponding installation make it possible to produce filler wires with relatively high running speeds. However, it is a disadvantage that it is not possible to reliably produce a completely satisfactory weld, as is required for a subsequent copper plating of the filler wire.

In another known process (DE-A1-2,515,342) for forming the tubular wire, a metal strip is shaped into a channel and is filled with the pulverulent material to form the core. Simultaneously, a cover strip with a longitudinal fold is placed in the channel, which is shaped to a tube and is welded by means of a welding apparatus at its longitudinal edges. Following welding, the closed tube is reduced to the desired diameter by a drwing process.

The use of the cover strip is intended to prevent particles of pulverulent material being deposited on the longitudinal edges of the tube to be welded, so as to impair the quality of the weld. However, this is only incompletely achieved in the case of the conventional welding speeds, so that here again a reliable weld is not obtained. The unequal material distribution in the tube wall is also disadvantageous so that such a welding rod can bend out during welding.

SUMMARY OF THE INVENTION

The present invention also relates to the production of a filler wire in a continuous process by shaping a metal strip. However, the problem of the invention is to so develop a process of the aforementioned type that, while avoiding the disadvantages of the known processes, it is possible to produce completely satisfactorily closed or seamed filler wires at a high production rate.

According to the invention, this problem is solved in that during the welding or seaming of the tube, the air flows occurring in the split tube and in the closed tube are drawn off in the vicinity of the welding or seaming zones.

The invention also covers an apparatus with a welding or seaming station enabling the process of the invention to be performed in an optimum manner. This problem is solved in that at least one suction device, whose suction pipe is placed over the end of the open tube is positioned upstream of the welding or seaming station.

The invention also covers an installation with the apparatus according to the invention, in which an elongation-reducing rolling mill is connected downstream of the welding and seaming station and has at least ten roll stands for reducing the tube diameter in the range of the final diameter or to the final diameter of the filler wire.

BRIEF DESCRIPTION OF THE DRAWINGS

The invention is described hereinafter relative to a non-limitative embodiment and with reference to the attached drawings, wherein:

FIG. 2 is a diagrammatic view of part of the installation of FIG. 1 with a dosing and welding station.

FIG. 3 is a section along line III—III of FIG. 2.

FIG. 4 is a view from direction IV in FIG. 2.

FIG. 5 is a section along line V—V of FIG. 2.

FIG. 6 is a section along line VI—VI of FIG. 2.

DETAILED DESCRIPTION OF THE INVENTION

Figure 1:
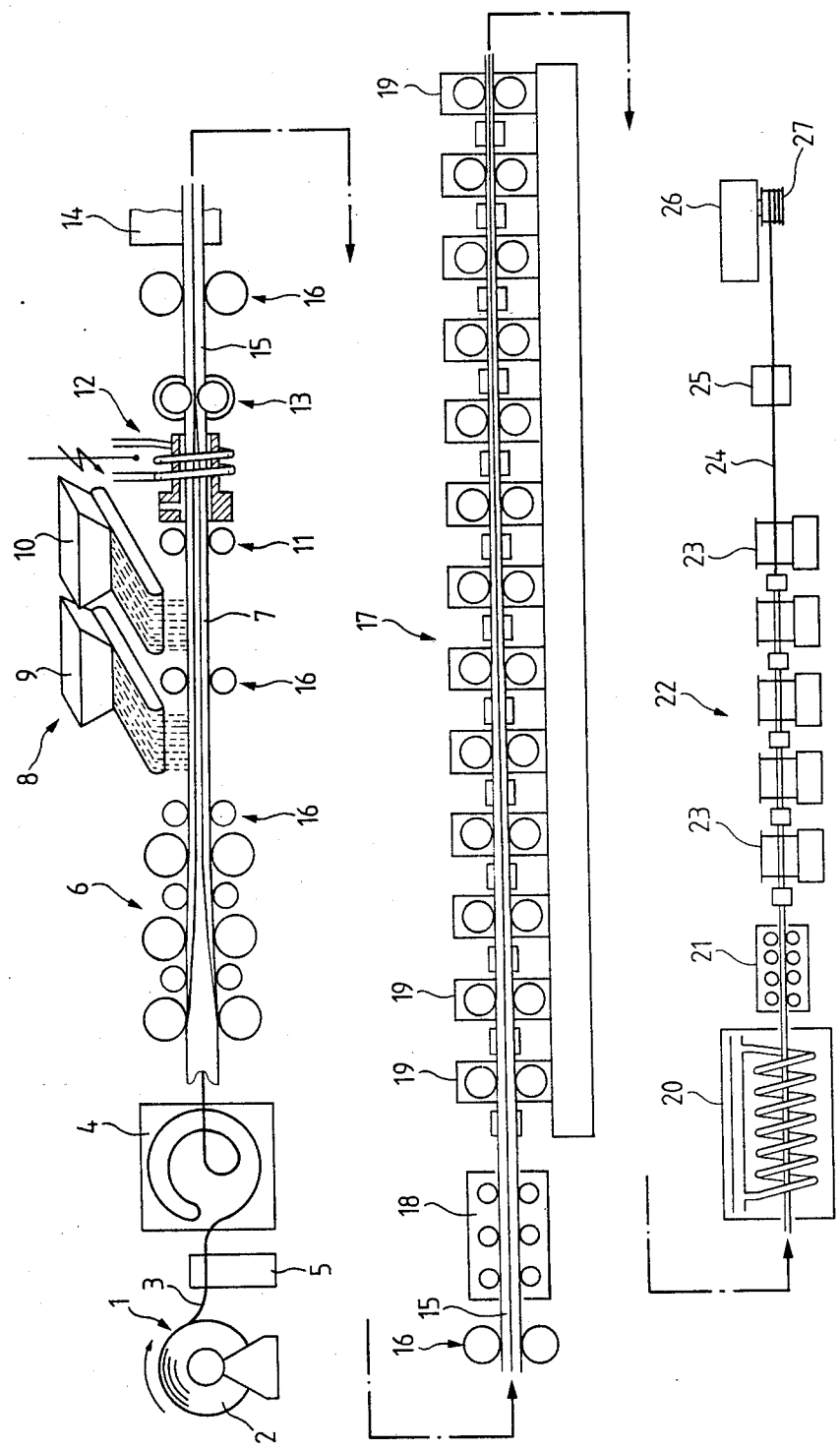
FIG. 1 is a diagrammatic representation of an installation for the continuous production of filler wires.

The installation for the continuous production of filler wires diagrammatically shown in FIG. 1 is subdivided into three parts for space reasons and these are linked in FIG. 1 by arrows. In practice, all three parts of this installation are arranged on one plane and in succession.

A strip 3 is unwound from a metal strip reel 2 mounted in rotary manner in an unwinding station 1 and the strip is fed to a strip storage means or magazine 4. A strip welding device 5 is used for joining the end of an unwound metal strip reel 2 to the beginning of a further, not shown metal strip reel. The strip magazine 4 is used for absorbing speed changes in the installation. Strip 3 is preshaped to form a split tube in tube shaping machine 6 downstream from magazine 4. The tube shaping machine 6 comprises a plurality of pairs of rollers enabling the shaping of the open tube or trough 7 to take place in stepwise manner.

From tube or trough shaping machine 6, the open tube 7 is fed to a dosing station 8, which is equipped with powder dosing balances 9, 10. The number of powder dosing balances set up in dosing station 8 depends on how many different powder components are to be filled into open tube or trough 7.

From dosing station 8, the open tube or trough 7 passes through a calibrating or sizing station 11 and then a welding station 12, which will be described in greater detail hereinafter. The longitudinal edges of open tube or trough 7 are heated to the welding temperature in welding station 12 and then welded in a compression rolling station 13, which has two compression rollers 40, 41 (shown turned by 90° in FIG. 2 for ease of representation). Welding station 12 can be equipped in several different ways, e.g. with a high frequency welding apparatus in the manner diagrammatically shown in FIG. 1. However, it is also possible to use other welding equipment, such as, for example, resistance welding equipment or the like.

In a shaving or chip cutting station 14, the weld is levelled out on the now closed tube 15, for example, by means of a planing operation. A cooling mechanism (not shown) can be arranged between the compression rolling station 13 and the chip cutting station 14. Pairs of rollers 16, shown in FIG. 1 between compression rolling station 13 and chip cutting station 14, essentially have guidance functions for the split tube 7 and closed tube 15 and, if required, can be inserted between the individual stations.

Before the closed tube 15 having its powder filling is introduced into an elongating-reducing roller mill 17, the tube 15 is treated in an emulsion tank 18. The diameter of the tube is reduced in the elongating-reducing rolling mill 17, for which purpose a number of roll stands 19 are used, which can be driven in groups or separately. The speed of the roll stands 19 can now be set in such a way that the ratio between elongating and reducing can be set in a random manner. For example, if the closed tube 15 has a diameter of 11 to 16 mm, a final diameter of 3 to 5 mm can be obtained in the elongating-reducing rolling mill 17, which in many cases already corresponds to the desired diameter of the finished filling wire. Even if a relatively large number of roll stands 19 must be used for achieving this final diameter, an advantage is obtained that it is possible to work with a much higher running speed of tube 15 and in addition it is possible to produce tubes with a much larger filling factor range, i.e. with the ratio between the tube material and the introduced filling material of the filler wire.

If smaller diameter filler wires are required, the rolling operation can be followed by a drawing operation. For this purpose, tube 15 is continuously annealed in an annealing device 20, e.g. with a high frequency, medium frequency or resistance heating system and at the same speed as that at which it leaves the rolling mill. It is then cooled in a cooling device 21 and drawn to the desired final diameter in a drawing installation 22. The latter comprises a plurality of precision drawing blocks 23, through which the tube can be drawn to the final diameter without any significant change to its wall thickness. In an inspection station 25, the completed filler wire 24 is checked for complete filling of the core with the pulverulent material and is subsequently wound onto spools 27 in a winding station 26. Here again, there can be at least one further, not shown winding station, so that the filler wire 24 can be transferred from a complete spool 27 to the next spool, without any change to the running speed. If required, a not shown copper plating bath can be inserted into the filler wire production process.

Fundamentally, the described installation makes it possible to introduce both a welded and a seamed filler wire. In the latter case, the welding station is replaced by a corresponding seaming station, but there is no need to modify the remaining parts of the installation. However, if a closed filler wire is produced, the installation parts shown in FIGS. 2 to 6 can bring about a significant rise to the production rate, accompanied by improved quality of the weld.

In FIGS. 2 to 6, the same reference numerals are used for the same parts as in FIG. 1 and will only be explained where this is considered necessary.

The open tube 7 runs from left to right in the direction of the arrow in FIG. 2. At the first powder dosing balance 9, a first component of the pulverulent material is dosed, e.g. a ferromagnetic or ferritic powder 28 (FIG. 5), which covers the bottom of the split tube 7. By means of the following second powder dosing balance 10, a further component, e.g a slag-forming powder 29 is brought onto the first coating 28. As a function of needs, more than two coatings can be dosed, for which purpose a corresponding number of powder dosing balances is used. The open tube 7 filled with the pulverulent material 28, 29 is calibrated or sized in calibrating or sizing station 11 by calibrating or sizing rollers 30, 31 and passes into the welding station 12, wherein only induction coil 32 is shown, which is arranged around a tubular connecting piece 33 which passes with clearance around tube 7 and which is made from a heat-resistant, e.g. ceramic material. On the inlet side end of connecting piece 33 is mounted, for example, a two-part casing 34, which is preferably of plastic, which forms a narrow passage 38 for the split tube 7, see FIG. 3. FIG. 3 also shows that over the opening of split tube 7, tube lines 36, 37 branch from passage 35, which form a jet or blasting apparatus together with a drive line 38 also arranged in casing 34. If the drive line 38 is supplied with compressed air or water, an induced draft is produced in lines 36, 37 and is used for drawing air out of the open tube 7. The jet or blasting equipment can be replaced by a vacuum pump, which also permits a dosed air removal.

Surprisingly, a significant improvement to the quality of the welded joint to be subsequently produced results from the removal of the air from the open tube 7 through the suction lines 36, 37 of the two jet apparatuses. The moving split tube 7 produces a cold air flow running in the same direction, while tube 15, which is closed after welding, forms a narrowing channel 39 (FIG. 6), so that in the latter is formed a heated, but dust-containing air flow directed counter to the movement of the tube. These two air flows acting in oppositely directed manner are now drawn off through the two suction lines 36, 37. As a result of this air removal, powder particles which could have become deposited on the longitudinal edges of the split tube 7 are sucked off, so that completely satisfactory conditions are provided for the welding of the two longitudinal edges of the open split tube 7. FIG. 4 also illustrates the welding process. Split tube 7, which is open at the top, is heated along its longitudinal edges by the induced high frequency current. This is followed by welding in the compression rolling station 13, the weld spot 42 being in the range of the smallest spacing of upsetting rollers 40, 41.

In high frequency welding (frequency 100 to 500 kHz), an alternating current flows in the split tube 7, the parts thereof flowing around the tube representing an active current, while only the current paths along the split are effective for the welding process. It is known to concentrate the current in the interior of the tube with the aid of an impeder, which is essentially a ferritic material rod and acts in the manner of an iron core in a field coil. If the impeder is placed in the open split tube 7 in the welding station 12, it is admittedly possible to reduce the power of the high frequency generator for a constant welding power. However, it is disadvantageous that the impeder is considerably heated and consequently requires cooling in permanent operation, so that the use of an impeder leads to complications. It has now surprisingly been found that the known impeder can be replaced if, during the dosing of the pulverulent material, a ferritic or ferromagnetic component is introduced into the split tube 7, e.g. as coating 28. This impeder formed by powder 28 is admittedly not located in the center of tube 7, but the gain in welding power is of much the same order of magnitude as in the known impeder. Appropriately, at least one non-magnetic component 29 is placed on the ferromagnetic powder 28, so that a transfer of the latter along the longitudinal edges of the split tube 7 is prevented. Component 28 consisting of a ferritic or ferromagnetic powder, consequently corresponds to an infinitely long impeder, which requires no cooling due to its constant renewal in the moving split tube 7.

As a result of the above process and apparatus, the quality of the weld is improved, even at high welding speeds of up to roughly 50 m/min. This is achieved by the dosed removal of the cold air flow in the open tube on the one hand and by the dosed removal of the return air flow contaminated by the dust particles in the narrowing channel 39 of closed tube 15 on the other, said flow having a high temperature. The suction device with one, two or more suction lines prevents the two air flows of different strength and temperature from whirling up the powder between the longitudinal edges of the open split tube 7 when said two flows meet. The suction removal also provides protection against electric flashovers between the induction coil and the tube, as well as against contamination of the induction coil. Moreover, the welding performance is improved by the use of a ferritic or ferromagnetic pulverulent impeder, which is located at the bottom of split tube 7. The same action is achieved if, in place of the pulverulent impeder, a wire or rod is placed in the bottom of the split tube 7. The insertion of a pulverulent, wire-like or rod-like impeder with or without suction removal, has advantages not only during the production of a filler wire, but also in tube production without filling material, because the insert can be repeatedly used. With the same successful results, suction removal also permits the use of other pulverulent materials, e.g. agglomerated materials or mixtures which, as a function of requirements, has ferritic or ferromagnetic components. The arrangement of the components in layers is a particularly preferred solution.

The described process and installation are suitable for the production of fillers for inert gas, metal arcs, arc strips, submerged arcs, electroslag and electrogas welding, as well as for injection and modification wires for use in metallurgical process technology. There are also no limitations regarding the geometry of the filler wire or tube to be produced.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the continuous production of a welded or seamed filler wire of random length formed from a metal tube and a pulverulent material filling which comprises providing a metal strip, shaping the metal strip to form a trough having a longitudinal opening at the top, advancing said trough, introducing pulverulent material into said longitudinal opening during its advance, forming a filled tube by compression and welding or seaming the longitudinal edges into a tube enclosing said pulverulent material filling, reducing the formed tube to a smaller diameter thereby forming the filler wire, wherein during the welding or seaming of the tube, the air flows occurring in the open trough and in the closed, formed tube are drawn off in the vicinity of the welding or seaming zones.

2. A process according to claim 1 wherein the pulverulent material, viewed in the feed direction of the tube, is introduced into the open trough upstream of the air suction point.

3. A process according to claim 1 wherein the pulverulent material is introduced in a manner selected from the group consisting of a dry mixture in the non-agglomerated state, a dry mixture in the agglomerated state or mixtures thereof.

4. A process according to claim 3 wherein the pulverulent material is introduced into the trough in successive partial doses and consequently a layerwise arrangement of different materials is achieved.

5. A process according to claim 4 wherein said pulverulent material consists of ferromagnetic and magnetic components.

6. A process according to claim 1 wherein after welding or seaming, the tube is reduced by rolling to the range of the final diameter.

7. A process according to claim 1 wherein, after welding or seaming, the tube is reduced by rolling and subsequent drawing to the final diameter, the tube being continuously annealed after rolling.

8. An apparatus for the continuous production of a welded or seamed filler wire of random length formed from a metal tube and a pulverulent material filling which comprises a metal strip supply means, means for shaping the metal strip to form a trough having a longitudinal opening at the top, means for introducing pulverulent material into the longitudinal opening, means for forming a filled tube to enclose the pulverulent material filling including a welding or seaming station to weld or seam the longitudinal edges, means for reducing the formed tube to a smaller diameter thereby forming the filler wire, and suction means upstream of the welding or seaming station to draw off the air flows occurring in the open trough and in the closed, formed tube in the vicinity of the welding or seaming station.

9. An apparatus according to claim 8 wherein said suction means includes a suction pipe placed over the end of the open trough.

10. An apparatus according to claim 8 wherein the suction means includes at least one suction pipe located in a casing surrounding the open trough.

11. An apparatus according to claim 8 including a welding station having a high frequency welding apparatus, the high frequency welding apparatus having a connecting piece located between a high frequency coil and the open trough, the suction means being fixed to its end facing the inflow side of the open trough.

12. An apparatus according to claim 8 wherein the welding and seaming station is followed on the downstream side by an elongating-reducing mill, which has at least ten roll frames for reducing the tube diameter to the range of the final diameter of the filler wire.

13. An apparatus according to claim 12 wherein an annealing device is connected downstream of the rolling mill and permits the continuous annealing of the tube leaving the rolling mill at the same speed as that at which it leaves said rolling mill.

14. An apparatus according to claim 13 wherein the annealing device has a heating system selected from the group consisting of high frequency heating system, medium frequency heating system and resistance heating system.

15. An apparatus according to claim 8 including means for continuously advancing said open trough, and means for introducing pulverulent material into the continuously advancing, open trough.

* * * * *